(No Model.)
E. S. BRAINARD.
MANUFACTURE OF SHOE CALK STOCK.
No. 372,398. Patented Nov. 1, 1887.
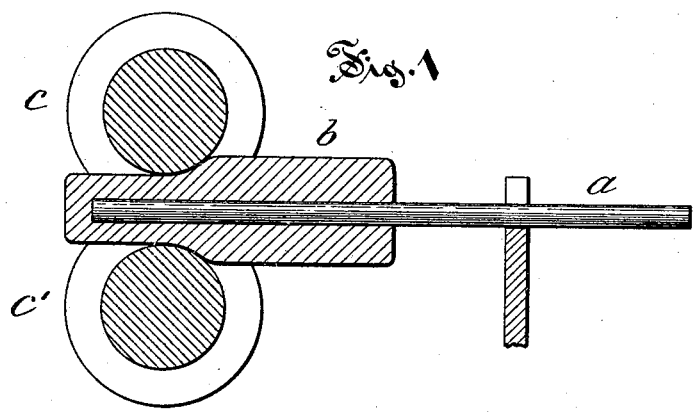
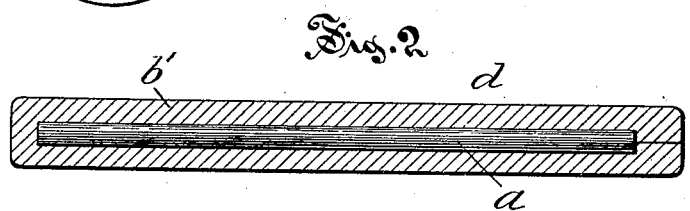
 
Witnesses:
W. M. Bjorkman
H. R. Williams
Inventor:
Edwin S. Brainard,
by Simonds & Burdett,
Attys.

UNITED STATES PATENT OFFICE.

EDWIN S. BRAINARD, OF BOSTON, MASSACHUSETTS.

MANUFACTURE OF SHOE-CALK STOCK.

SPECIFICATION forming part of Letters Patent No. 372,398, dated November 1, 1887.

Application filed March 18, 1887. Serial No. 231,353. (No model.)

*To all whom it may concern:*

Be it known that I, EDWIN S. BRAINARD, of Boston, in the county of Suffolk and State of Massachusetts, have invented certain new and useful Improvements in the Manufacture of Shoe-Calk Stock, of which the following is a full, clear, and exact description, whereby any one skilled in the art can make and use the same.

The object of my invention is to produce stock for making steel-centered horseshoe-calks by a process that is cheaper than any of those now employed, and one that is free from certain defects and dangers that are incident to the making of such stock by an old process, on which my present invention is an improvement.

My invention consists in the method or process of making steel-centered stock, that consists in first rolling or drawing a covering-layer of iron while hot over a steel rod or core and inclosing the latter on both ends; second, heating this billet to a welding heat and drawing it down to a rod of the desired size for blanks for calks; and it further consists in details of the said process, as more particularly hereinafter described, and pointed out in the claims.

Referring to the drawings, Figure 1 is a detail view showing a pair of rolls in cross-section and the composite bar partly rolled. Fig. 2 is a view in lengthwise central section of the composite bar. Fig. 3 is a like view in central section of a rod of stock reduced to working size for blanks. Fig. 4 is a detail view in central section of a steel-centered horseshoe-calk.

In the accompanying drawings, the letter *a* denotes a steel rod or core; *b*, a mass of iron that is heated to a degree sufficient to enable it to be rolled and drawn, as by the grooved rollers *c c'*, upon and over the core in a layer or cover, *b'*, of any thickness that may be desired, depending of course on the relative diameter of the core and depth of groove in the rolls. The core is preferably, and in fact, to gain the best result, should be, cold, or nearly so, when its end is inserted into the mass *b* prior to the rolling, and when thus inserted, and before the rolling begins, the end of the core is covered by an end wall of the mass, as shown in Fig. 1. When the end of the core passes through the rolls, the mass closes over it and welds together, so that the steel core is completely and thoroughly inclosed within the cover and the composite bar *d* is formed. This bar is composed of an inner rod or core of steel and an outer cover of iron, and is made somewhat larger than the rod of stock to allow for the operation of welding the cover to the core, and this is effected by heating the bar to a welding heat, preferably as soon as the bar is produced, and for the purpose of taking advantage of the heated condition of the bar as it comes from the rolls, and then rolling the heated bar and reducing it in diameter until it is of the desired size. The rod, when finally produced, is cut into suitable lengths of stock, *e*, and this steel centered stock is then made up, as on a screw-machine, into the calks *f*. By this process all chance of loss of carbon in making the stock is avoided in the covering process, owing to the fact that the steel core is not heated to a degree sufficient to effect any loss of carbon, and in the welding process, owing to the closeness and continuity of the cover. In this process of reducing the bar there is not only no danger of loss of carbon, but there are no plugs or end pieces to be driven out, to the injury of the workmen, as is the case in reducing prior piles of somewhat similar arrangement of cover and core.

I claim as my invention—

1. The improved method of making a composite bar of steel-centered stock, that consists in first enveloping, as by rolling or drawing, a steel rod or core with a covering-layer of heated iron integral on one end and along the sides and closed upon the other end of the rod in rolling; second, heating the resulting billet to a welding heat, and then drawing the same down to a rod or stock of the desired size, all substantially as described.

2. The improved composite bar, consisting of a steel core enveloped in a covering-layer of iron integral on one end of the core and closed and welded over the other end of the core, all substantially as described.

EDWIN S. BRAINARD.

Witnesses:
CHAS. L. BURDETT,
H. R. WILLIAMS.